United States Patent
Jacquemard et al.

(10) Patent No.: US 12,044,305 B2
(45) Date of Patent: Jul. 23, 2024

(54) PLANETARY REDUCTION GEAR FOR AN AIRCRAFT TURBINE ENGINE

(71) Applicant: SAFRAN AIRCRAFT ENGINES, Paris (FR)

(72) Inventors: Christophe Paul Jacquemard, Moissy-Cramayel (FR); Didier Gabriel Bertrand Desombre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 71 days.

(21) Appl. No.: 17/596,045

(22) PCT Filed: May 29, 2020

(86) PCT No.: PCT/FR2020/050926
§ 371 (c)(1),
(2) Date: Dec. 2, 2021

(87) PCT Pub. No.: WO2020/245529
PCT Pub. Date: Dec. 10, 2020

(65) Prior Publication Data
US 2022/0316584 A1    Oct. 6, 2022

(30) Foreign Application Priority Data
Jun. 6, 2019 (FR) ...................... 1906010

(51) Int. Cl.
*F16H 57/04* (2010.01)
*F02C 7/36* (2006.01)
*F16N 39/00* (2006.01)

(52) U.S. Cl.
CPC ........... *F16H 57/0486* (2013.01); *F02C 7/36* (2013.01); *F16H 57/0427* (2013.01);
(Continued)

(58) Field of Classification Search
CPC ...... F16H 57/0486; F16H 57/042; F02C 7/36; F16N 39/002
See application file for complete search history.

(56) References Cited

U.S. PATENT DOCUMENTS

| 11,125,318 | B2 * | 9/2021 | Chevillot | F16H 57/0456 |
| 2012/0238401 | A1 * | 9/2012 | McCune | F01D 5/027 475/331 |

(Continued)

FOREIGN PATENT DOCUMENTS

| EP | 3054139 A1 | 8/2016 |
| EP | 3473893 A1 | 4/2019 |

(Continued)

OTHER PUBLICATIONS

International Search Report received for PCT Patent Application No. PCT/FR2020/050926, mailed on Sep. 14, 2020, 5 pages (2 pages of English Translation and 3 pages of Original Document).

*Primary Examiner* — Derek D Knight
(74) *Attorney, Agent, or Firm* — WOMBLE BOND DICKINSON (US) LLP

(57) ABSTRACT

A planetary reduction gear (10) for an aircraft turbine engine, said reduction gear comprising a rotatable sun gear, a rotatable ring gear (9) and satellite gears meshed with the sun gear and the ring gear and carried by a planet carrier intended to be fixed to a stator, the reduction gear further comprising an annular trough for recovering and channelling lubrication oil that is mounted around the ring gear, characterised in that the reduction gear further comprises an annular deflector (22) fixed to the ring gear and configured to route the oil exiting radially towards the outside of the ring gear up to the trough by virtue of centrifugal forces, the trough comprising an annular chamber (18) which is axially remote relative to a median plane (P) substantially passing (Continued)

through the centre of the ring gear, and an annular duct (20) located on a side of said chamber and emerging in said chamber.

29 Claims, 4 Drawing Sheets

(52) U.S. Cl.
CPC ...... *F16N 39/002* (2013.01); *F05D 2220/323* (2013.01); *F05D 2260/40311* (2013.01); *F05D 2260/98* (2013.01)

(56) References Cited

U.S. PATENT DOCUMENTS

| | | |
|---|---|---|
| 2013/0225353 A1 | 8/2013 | Gallet et al. |
| 2019/0113127 A1* | 4/2019 | Gravina ................ F02C 7/06 |

FOREIGN PATENT DOCUMENTS

| | | | |
|---|---|---|---|
| EP | 3575562 A1 * | 12/2019 | ............. F01D 25/18 |
| FR | 2987416 A1 | 8/2013 | |
| FR | 3041054 A1 | 3/2017 | |
| FR | 3052522 A1 | 12/2017 | |
| WO | 2010/092263 A1 | 8/2010 | |
| WO | 2015/026899 A1 | 2/2015 | |

* cited by examiner

PLANETARY REDUCTION GEAR FOR AN AIRCRAFT TURBINE ENGINE

TECHNICAL FIELD OF THE INVENTION

The present invention relates to the field of aircraft turbine engines, in particular to dual-flow turbojet engines comprising a planetary reduction gear. It is aimed more particularly at the devices for recovering and channelling the oil necessary for lubricating the reduction gear.

TECHNICAL BACKGROUND

The prior art comprises, in particular, the documents WO-A1-2010/092263, FR-A1-2 987 416 and FR-A1-3 041 054.

The role of a mechanical reduction gear is to change the speed and torque ratio between the input and output axles of a mechanism.

The newer generations of dual flow turbojet engines, in particular, those with high bypass ratios, comprise a mechanical reduction gear to drive a shaft of a fan. Typically, the purpose of the reduction gear is to transform the so-called fast rotational speed of the shaft of a power turbine into a slower rotational speed for the shaft driving the fan.

Such a reduction gear comprises a central pinion, called the sun gear, a ring gear and pinions called planet gears, which are engaged between the sun gear and the ring gear. The planet gears are held by a frame called a planet carrier. The sun gear, the ring gear and the planet carrier are planetary gears because their axes of revolution coincide with the longitudinal axis X of the turbine engine. The planet gears each have a different axis of revolution Y, they are equidistant on the same operating diameter around the axis of the planetary gears. These axes Y are parallel to the longitudinal axis X.

There are several reduction gear designs. In the prior art of dual flow turbojet engines, the reduction gears are of the planetary or epicyclic type. In other similar applications, there are so-called differential or "compound" architectures.

In a planetary reduction gear, the planet carrier is fixed and the ring gear is the output shaft of the device, which turns in the opposite direction to the sun gear.

On an epicyclic reduction gear, the ring gear is fixed and the planet carrier is the output shaft of the device which rotates in the same direction as the sun gear.

On a compound reduction gear, no element is fixed in rotation. The ring gear rotates in the opposite direction to the sun gear and the planet carrier.

The reduction gears can have one or more meshing stages. This meshing is achieved in different ways such as by contact, friction or magnetic fields. There are several types of contact meshing, such as straight and herringbone toothings.

A reduction gear must be lubricated and the supply of lubricating oil to the rotating components of a reduction gear can be problematic. The oil is usually supplied to the reduction gear by a lubricating oil distributor.

In the case of a planetary reduction gear, the oil circulating in the reduction gear to lubricate the rolling elements and toothings is discharged at the periphery by centrifugation through the ring gear, which can rotate at up to about 3000 rpm.

It has already been proposed to place a gutter for recovering and channelling oil around the ring gear of the reduction gear, in line with the oil outlets of the ring gear. However, the oil sprayed into the gutter tends to bounce back and be returned to the reduction gear. In addition, aeration and foaming of the oil can occur due to the high speed projection of the oil on the walls of the gutter.

The oil must therefore be recovered and channelled as efficiently as possible to the outside of the ring gear, in order to:
  be cooled and then reinjected into the lubrication circuit of the reduction gear;
  minimise hot oil splashing out of the reduction gear and thus to limit:
    heat exchange between the oil and the casing carrying the reduction gear,
    oil retention in the enclosure of the reduction gear and therefore the size of the tank;
  limit oil consumption via the degassing circuit of the enclosure containing the reduction gear.

The invention is intended to meet these objectives in a simple and inexpensive manner.

SUMMARY OF THE INVENTION

The invention relates to an epicyclic reduction gear for an aircraft turbine engine, this reduction gear comprising a rotatable sun gear, a rotatable ring gear, and planet gears meshed with the sun gear and ring gear and carried by a planet carrier intended to be fixed to a stator, said reduction gear further comprising an annular gutter for recovering and channelling lubrication oil that is mounted around the ring gear, characterised in that the reduction gear further comprises an annular deflector fixed to the ring gear and configured to route the oil exiting radially towards the outside of the ring gear up to the gutter by virtue of centrifugal forces, the gutter comprising:
  an annular chamber which is axially remote relative to a median plane substantially passing through the centre of the ring gear, and
  an annular duct located on one side of said chamber and emerging into said chamber, this annular duct being configured to receive the oil routed by said deflector and to ensure its flow to the chamber.

In a planetary reduction gear, the lubricating oil passes radially through the ring gear and is thrown radially outwards by centrifugation. The invention proposes to recover and channel this oil by means of a gutter which is not intended to recover the projected oil directly. In fact, the gutter is offset axially with respect to the oil outlets of the ring gear and receives the sprayed oil via an annular deflector. The deflector captures the oil and reroutes it to a chamber in the gutter.

The invention thus allows to increase the volume capacity of the gutter, which is not limited by the radial space available at the oil outlets of the ring gear. In addition, the risk of oil splashing is limited thanks to the deflector which routes the oil to the chamber of the gutter.

The use of a deflector has several advantages. The deflector can be shaped to limit the oil splashes on its walls. The area of impact of the oil on the deflector is advantageously located at a predetermined distance from the reduction gear, allowing the oil film to be provided with additional energy, taking into account a radial position and a peripheral speed slightly higher than those of the oil outlets of the ring gear. The integration of the deflector perpendicularly with the oil outlets of the ring gear replaces the gutter of the prior art, and therefore has no impact on the space requirement in the enclosure in which the reduction gear is mounted and lubricated. The deflector then helps to direct the oil into the chamber of the gutter, which can be located upstream or downstream. To do this, it is possible to envisage different shapes and geometries at the outlet of the deflector (truncated cone shape for example) to facilitate the flow towards the chamber.

The reduction gear according to the invention may comprise one or more of the following features, taken in isolation from each other, or in combination with each other:
- the annular chamber defines a first upper semi-circular trough with a U-shaped axial cross-section, which extends substantially from 9 o'clock to 12 o'clock and from 12 o'clock to 3 o'clock by analogy with the dial of a clock, and a second lower semi-circular trough with a U-shaped axial cross-section, which extends substantially from 9 o'clock to 6 o'clock and from 6 o'clock to 3 o'clock by analogy with the dial of a clock,
- said first trough comprises a bottom defined by an inner cylindrical wall of the chamber, and said second trough comprises a bottom defined by an outer cylindrical wall of the chamber,
- the outer cylindrical wall comprises a radial opening for discharging oil,
- the inner and outer cylindrical walls have axes that are not aligned with each other and/or are not aligned with a longitudinal axis of the reduction gear,
- the first trough is connected to a radially inner annular wall forming part of said duct, and the second trough is connected to a radially outer annular wall forming part of said duct,
- a perforated annular partition is housed in said chamber and is configured to deaerate the oil,
- the partition comprises a first sector extending into the first trough, substantially at said radially inner annular wall, and a second sector extending into the second trough, substantially at said radially outer annular wall.

The invention also relates to an aircraft turbine engine, comprising a planetary reduction gear comprising a rotatable outer cover for recovering oil and surrounded by at least one gutter as described herein.

BRIEF DESCRIPTION OF THE FIGURES

The present invention will be better understood and further details, features and advantages of the present invention will become clearer from the following description, with reference to the attached drawings in which.

DETAILED DESCRIPTION OF THE INVENTION

Figure 1:
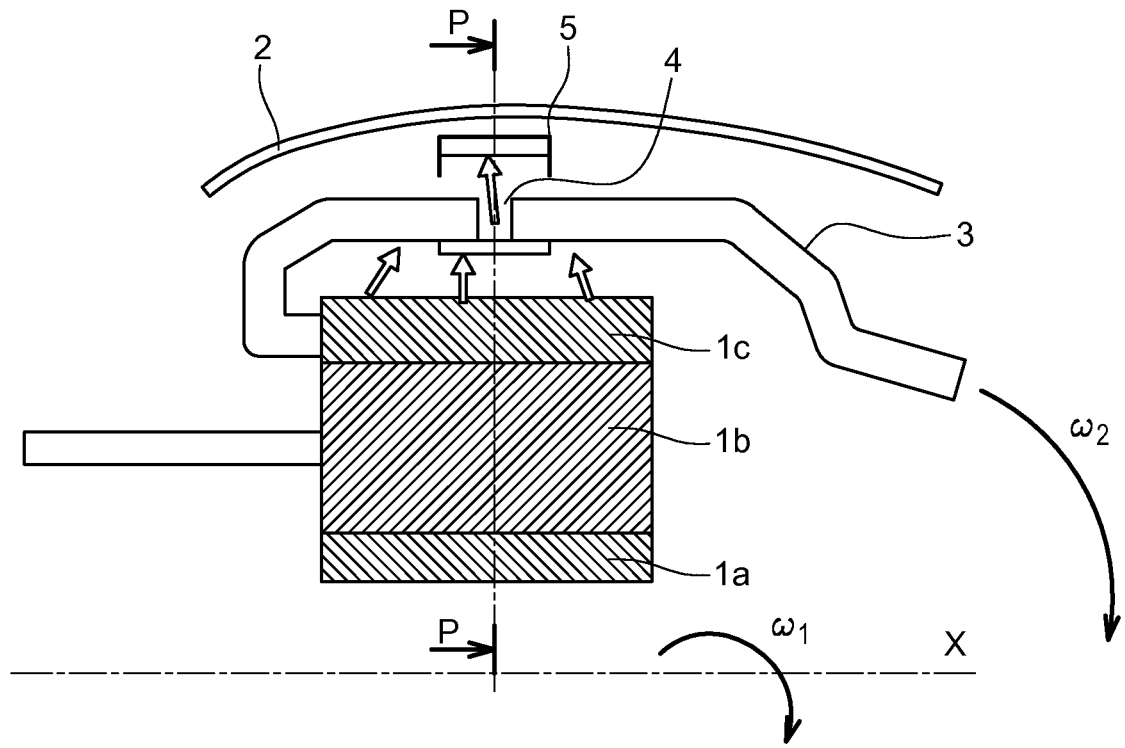
FIG. 1 shows a schematic view of a planetary reduction gear of a turbine engine in axial section.
Figure 2:
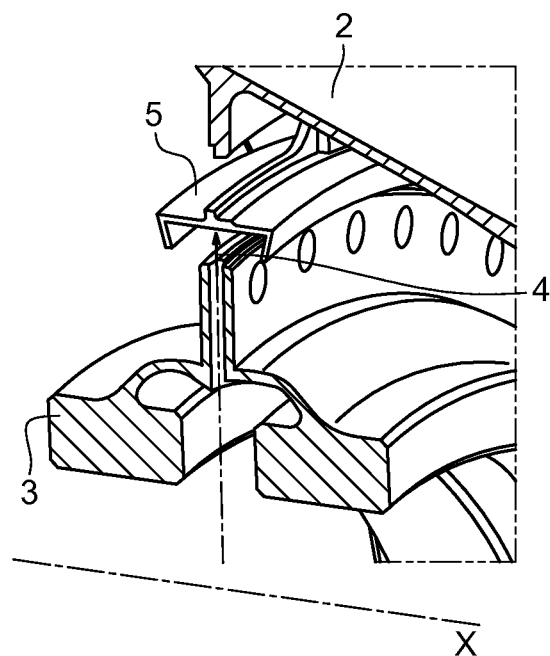
FIG. 2 is a partial schematic view in axial section and in perspective of a gutter of a reduction gear according to the prior art.

FIG. 1 shows very schematically a planetary reduction gear for a turbine engine, with an epicyclic gear train 1a-1b-1c, which is mounted in an enclosure 2. The reference X designates a longitudinal axis of the turbine engine, which is the axis of rotation of its rotors and the reduction gear.

The innermost part 1a with respect to the axis X represents a sun gear in the form of a motor pinion, which is mounted by a spline connection on a turbine shaft, not shown, and which rotates at a determined speed col.

The part 1b represents a planet carrier supporting, for example, three planet gears that mesh around the sun gear 1a. Here, the planet carrier is fixed to the static parts of the turbine engine. The outer part 1c represents an outer ring gear that meshes with the planet gears.

The size ratios between the different elements are arranged, here, so that the outer ring gear rotates at a speed ca, reduced compared to that of the sun gear 1a, with the planet gears rotating relative to the planet carrier.

This brief description illustrates the fact that in such a device many pieces are in contact with large relative movements and forces, requiring a large amount of oil for lubrication and cooling.

An oil inlet, not shown in the figure, supplies oil to the reduction gear for lubrication. This oil is centrifugally driven through various active parts of the reduction gear, such as toothings, and is driven radially outwards by centrifugation.

The ring gear 3 is shaped to recover the oil that has lubricated the reduction gear, the path of which is represented by arrows, and to guide it towards outlet orifices 4. These orifices 4 are advantageously located in a zone of maximum radius of the ring gear 3 to facilitate the discharge of the oil by centrifugation. Moreover, they are generally several and preferably uniformly distributed around the circumference in a plane P perpendicular to the axis of rotation X.

An annular gutter 5 surrounds the reduction gear in the plane P and is configured to recover the oil ejected from the ring gear 3 by centrifugation. This gutter 5 is fixed to the enclosure 2 and therefore extends in line with the orifices 4, which leads to the disadvantages described above.

Figure 3:
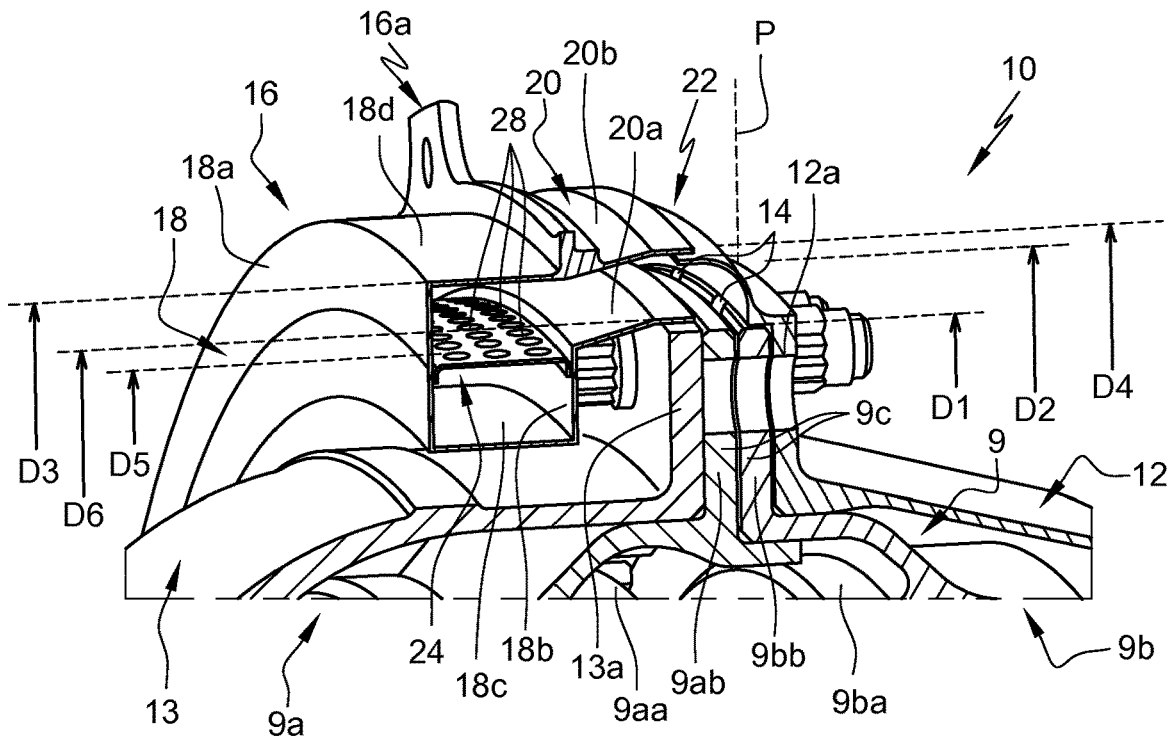
FIG. 3 represents a partial schematic view of a reduction gear according to the invention in axial section and perspective, the sectional plane being situated at 12 o'clock by analogy with the dial of a clock.
Figure 4:
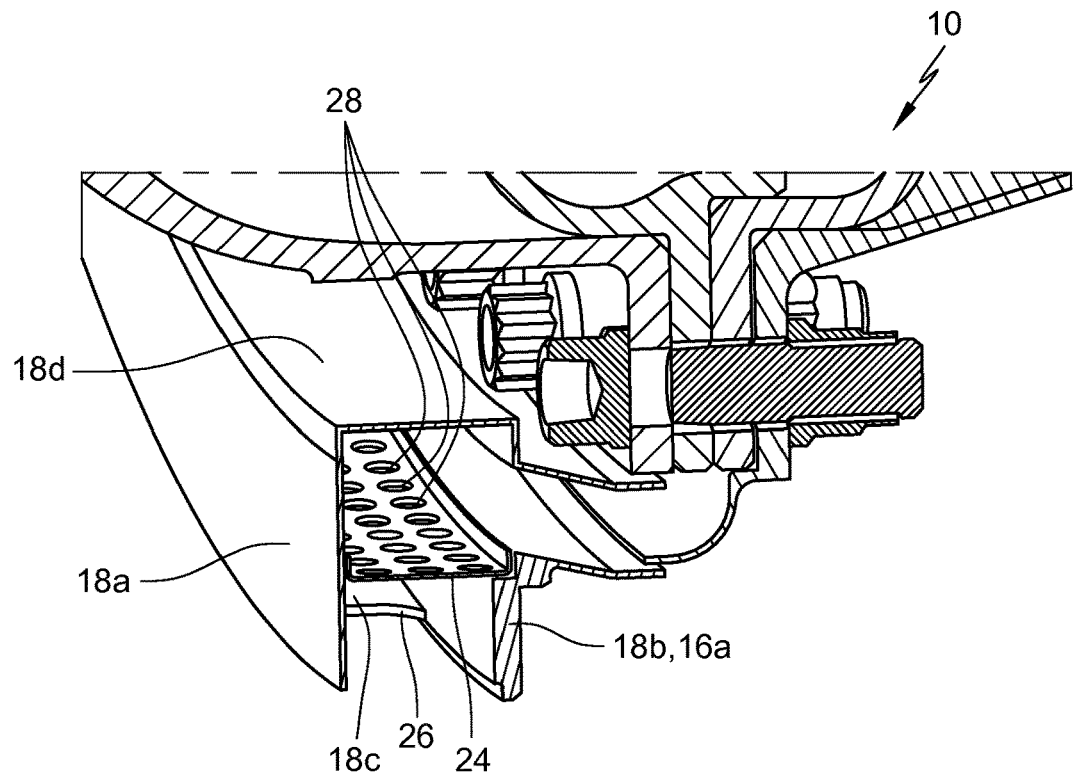
FIG. 4 represents another partial schematic view in axial section and in perspective of the reduction gear of FIG. 3, the sectional plane being situated at 6 o'clock by analogy with the dial of a clock.

FIGS. 3 and 4 illustrate an embodiment of a reduction gear 10 according to the invention.

As mentioned above, the reduction gear 10 comprises a sun gear, planet gears carried by a planet carrier, and a ring gear 9, only the ring gear being partially visible in the drawings.

The reduction gear 10 is of the planetary type, i.e., the sun gear and ring gear 9 are rotatable, while the planet carrier is fixed.

The ring gear 9 is separated into two half ring gears:
- an upstream half ring gear 9a consisting of a rim 9aa and a mounting half-flange 9ab. On the rim 9aa is the upstream helix of the toothing of the reduction gear. This upstream helix meshes with those of the planet gears which mesh with one of the sun gear;
- a downstream half ring gear 9b consisting of a rim 9ba and a mounting half-flange 9bb. On the rim 9ba is the downstream helix of the toothing of the reduction gear. This downstream helix meshes with those of the planet gears which mesh with the one of the sun gear.

The mounting half-flange 9ab of the upstream ring gear 9a and the mounting half-flange 9bb of the downstream ring gear 9b form the mounting flange 9c of the ring gear.

The ring gear 9 is fixed to an annular ring gear carrier 12 by joining the mounting flange 9c of the ring gear and the mounting flange 12a of the ring gear carrier 12 by means of a bolted assembly, for example. The ring gear carrier 12 extends around the half ring gear 9b and its mounting flange 12a is applied to the downstream face of the half-flange 9bb.

The ring gear 9 is further fixed to a fan shaft 13 using the same bolted assembly. The shaft 13 extends around the half ring gear 9a and comprises a mounting flange 13a applied to the upstream side of the half-flange 9ab.

As mentioned above and illustrating the prior art, the ring gear 9 comprises oil outlet orifices at its outer periphery. These orifices are formed by radial lunulae 14 formed in the facing faces of the flanges 9ab, 9bb, i.e. in the plane P which represents here the bearing plane of these flanges.

The reduction gear 10 comprises an annular gutter 16 for recovering and channelling the lubricating oil of the reduction gear 10, which is mounted around the reduction gear 10 and in particular around its ring gear 9.

According to the invention, this gutter 16 is offset with respect to the plane P which substantially passes through the centre of the ring gear 9, in the axial direction. In the example shown, it is located upstream of this plane P and comprises two annular parts, namely an annular chamber 18 and an annular duct 20.

The reduction gear 10 further comprises an annular deflector 22 which is here fixed to the ring gear 9. The deflector 22 is here connected to the ring gear carrier 12. More precisely, the ring gear carrier 12 is formed in one piece with the deflector 22 extending radially towards the outside from the flange 12a.

The deflector 22 extends around the lunulae 14 and is curved in axial cross-section, the concavity of which is oriented upstream and radially towards the inside.

In the example shown, the flanges 13a, 12a and half-flanges 9ab, 9bb have an outer diameter D1 and the deflector 22 extends between the minimum diameter D1 and the maximum diameter D2. The deflector 22 further extends axially from its downstream axial end located downstream of the plane P, at the level of the half-flange 9bb or the flange 12a, to its upstream end located upstream of the plane P, at the level of the half-flange 9ab or the flange 13a. The upstream end of the deflector 22 thus extends around and radially away from the flange 13a.

The duct 20 is annular in shape and comprises two coaxial annular walls, inner 20a and outer 20b respectively. The duct 20 and its walls 20a, 20b are centred on the axis X of the turbine engine and the reduction gear 10.

The walls 20a, 20b each have a generally frustoconical shape. The outer wall 20b comprises an upstream end of smaller diameter D3 and a downstream end of larger diameter D4. D4 is greater than D2 and the downstream end of the wall 20b extends around the upstream end of the deflector 22. The inner wall 20a comprises an upstream end of smaller diameter D5 and a downstream end of larger diameter D6. D6 is greater than D1 and the downstream end of the wall 20a extends around the flange 13a and inside the upstream end of the deflector 22.

The gutter 16 is fixed while the deflector 22 is rotatable with the ring gear 9. Sufficient radial clearances are therefore provided between the flange 13a and the wall 20a, on the one hand, and between the deflector 22 and the wall 20b, on the other hand, to allow the rotation of one with respect to the other.

Figure 5:
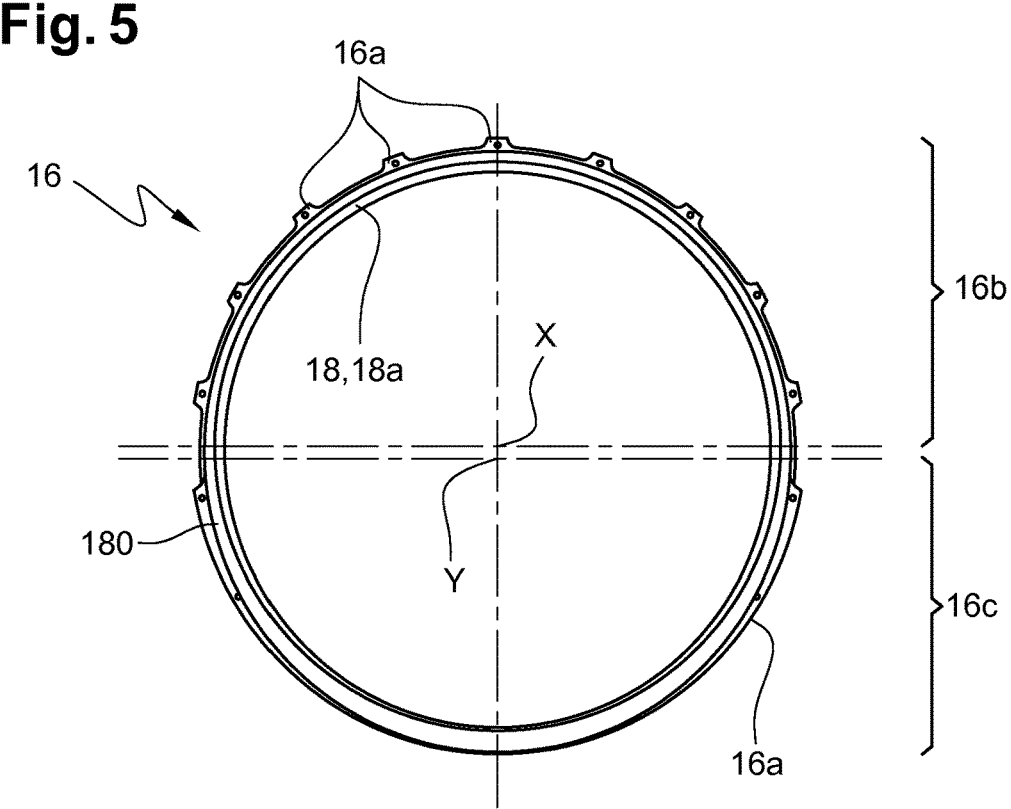
FIG. 5 is a schematic perspective view of the gutter of the reduction gear of FIGS. 3 and 4.
Figure 6:
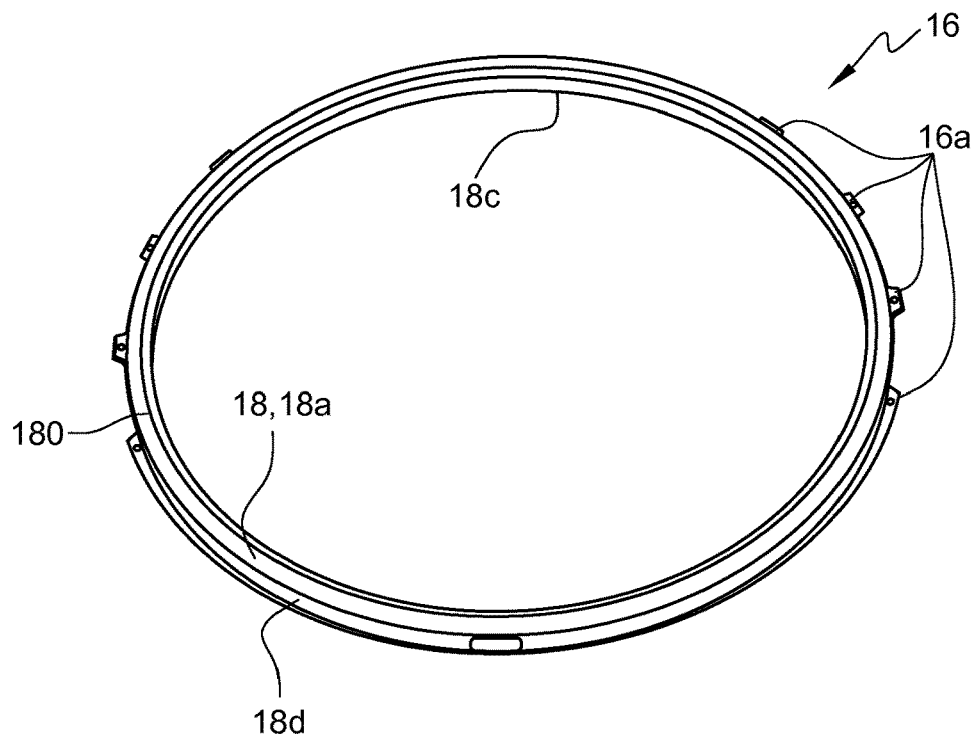
FIG. 6 is another schematic perspective view of the gutter of the reduction gear of FIGS. 3 and 4.

The gutter 16 is fixed to a stator of the turbine engine, such as the aforementioned enclosure 2, by means of a radial flange 16a. As can be seen in FIGS. 5 and 6, the gutter 16 can be considered to have two sectors, upper 16b and lower 16c respectively. The upper sector 16b has an angular extent of approximately 180° and extends from 9 o'clock to 12 o'clock and from 12 o'clock to 3 o'clock by analogy with the dial of a clock. The lower sector 16c also has an angular extent of approximately 180° and extends from 9 o'clock to 6 o'clock and from 6 o'clock to 3 o'clock by analogy with the dial of a clock.

At the upper sector 16b, the flange 16a is in the form of a series of regularly spaced radial lugs each pierced with an orifice for the passage of a screw or the like. In the lower sector, the flange 16a is in the form of a radial edge which is continuous over 360° and which comprises in places, and in particular at the circumferential ends of this edge, orifices for the passage of screws.

The chamber 18 is annular in shape and is generally parallelepipedal in axial section. It comprises two radially oriented side walls, respectively upstream 18a and downstream 18b, and connected to each other by cylindrical walls, respectively inner 18c and outer 18d. The chamber 18 delimits an inner annular space which is divided into two parts, respectively inner and outer, by a perforated annular partition 24.

The upstream side wall 18a is continuous over 360°. As can be seen in FIGS. 5 and 6, its axis of revolution Y is not aligned with the axis X but is offset downwards (or towards 6 o'clock). This results in a downward (or towards 6 o'clock) shift of this upstream wall 18a. FIGS. 3 and 4 show, for example, that the inner periphery of the wall 18a is located close to the shaft 13 at 12 o'clock (FIG. 5) whereas it is located close to the outer periphery of the flange 13a at 6 o'clock (FIG. 6).

The downstream side wall 18b is continuous through 360° and comprises an annular opening for fluid communication with the upstream end of the duct 20. The wall 18b is thus connected to the walls 20a, 20b of the duct 20. This wall 18b is furthermore offset, like the wall 18a, with respect to the axis X (FIGS. 3 and 4). FIG. 4 shows that the wall 18b is merged with the flange 16a.

The inner cylindrical wall 18c extends around the shaft 13 and also follows the same offset from the axis X (FIGS. 3 and 4).

The circular line 180 visible in FIG. 5 and FIG. 6 is representative of the aforementioned offsets for the inner 18c and outer 18d cylindrical walls of the chamber 18, respectively.

The outer cylindrical wall extends around the shaft 13 and also follows the same offset from the axis X (FIGS. 3 and 4). This outer wall 18d includes a radial opening 26 at 6 o'clock which is configured for the flow and discharge of oil for recycling.

The partition 24 is generally U-shaped in section and comprises a flat median part perforated with oil passage orifices 28, and two radial annular edges at its axial ends. These edges are oriented radially towards the inside and are supported inside the chamber 18, on the faces facing the side walls 18a, 18b. The partition 24 is also offset with respect to the axis X and is aligned with the upstream end 20a of the inner wall on the upper half of the gutter, and aligned with the upstream end of the outer wall 20b on the lower half of the gutter. The plane, perforated median part of oil passage orifices 28 of the partition 24 is substantially equidistant from the cylindrical inner 18c and outer 18d walls of the chamber 18, respectively.

The orifices 28 of the partition 24 are calibrated. This function of this partition is to slow down the speed of the fluid and thus to avoid the foaming effect which would be due to too great a speed of deaeration of the oil leaving the reduction gear. The oil thus collected in chamber 18 is properly deaerated, improving its flow and capture.

In operation, the oil can be recovered in the following way. The oil is sprayed through the lunulae 14 onto the deflector 22 and is immediately redirected upstream towards the inside of the duct 20. The oil passes from a rotating marker to a fixed marker. Inside the duct 20, the oil maintains a certain speed and reaches the chamber 18. In the upper sector 16c, the chamber 18 comprises or forms a semi-annular trough which is U-shaped, the opening of which is oriented radially towards the outside and closed by the partition 24. The oil is received in this trough and flows by gravity through the partition 24 and then circumferentially to the circumferential ends of the trough. In the lower sector 16d, the chamber 18 comprises or forms a semi-annular trough which is U-shaped, the opening of which is oriented radially towards the inside and closed by the partition 24. The oil is received in this trough and flows by gravity through the partition 24 and then circumferentially to the lowest point of the gutter, where the oil can pass through the opening 26 for recycling.

Figure 7:
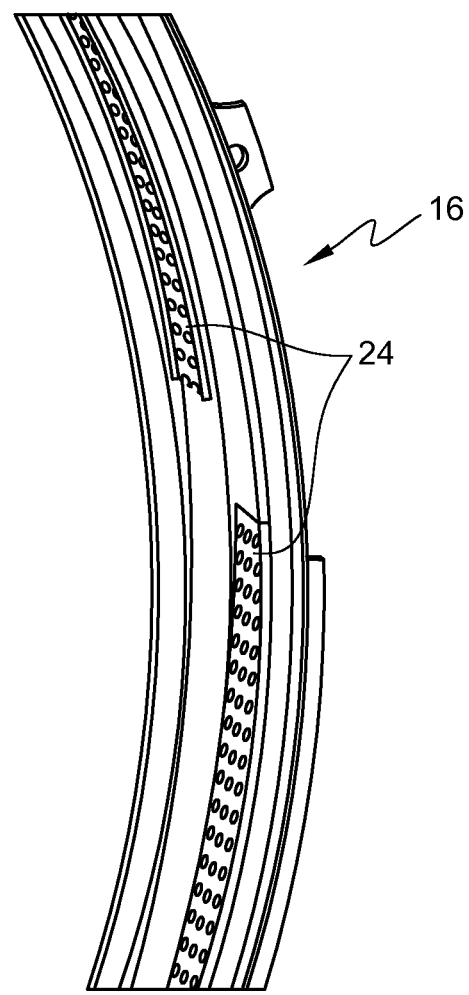
FIG. 7 is a further partial schematic perspective view of the gutter of the reduction gear of FIGS. 3 and 4.

The partition 24 may extend continuously over 360. Alternatively, it could be sectorised and comprise at least two independent sectors. These sectors may overlap each other at their circumferential ends. Alternatively, these ends could be spaced apart, as illustrated in FIG. 7, so as to facilitate the transition of the partition between the aforementioned troughs.

The invention claimed is:

1. A planetary reduction gear for an aircraft turbine engine, said reduction gear comprising a rotatable sun gear, a rotatable ring gear, and planet gears meshed with the sun gear and ring gear and carried by a planet carrier intended to be fixed to a stator, said reduction gear further comprising an annular gutter for recovering and channelling lubrication oil that is mounted around the ring gear, said ring gear comprising fastening flanges and oil outlet orifices formed in facing faces of said fastening flanges, said facing faces being separated by a median plane substantially passing through a center of the ring gear, wherein the reduction gear further comprises an annular deflector fixed to said fastening flanges and configured to route the oil exiting radially towards said oil outlet orifices up to the gutter by virtue of centrifugal forces, said annular deflector protruding radially outwards the fastening flanges and having a free annular edge located radially outside from the fastening flanges, the gutter comprising:
   a) an annular chamber which is axially remote relative to said median plane (P), and
   b) an annular duct located on one side of said chamber and emerging into said chamber, this annular duct being configured to receive the oil routed by said deflector and to ensure its flow to the chamber,
   wherein said annular duct extends about said free annular edge.

2. The reduction gear according to claim 1, wherein the annular chamber defines a first upper semi-circular trough with a U-shaped axial cross-section, which extends substantially from 9 o'clock to 12 o'clock and from 12 o'clock to 3 o'clock by analogy with a dial of a clock, and a second lower semi-circular trough with a U-shaped axial cross-section, which extends substantially from 9 o'clock to 6 o'clock and from 6 o'clock to 3 o'clock by analogy with a dial of a clock.

3. The reduction gear according to claim 2, wherein said first trough comprises a bottom defined by an inner cylindrical wall of the chamber, and said second trough comprises a bottom defined by an outer cylindrical wall of the chamber.

4. The reduction gear according to claim 3, wherein the outer cylindrical wall comprises a radial opening for discharging oil.

5. The reduction gear according to claim 3, wherein the inner and outer cylindrical walls have axes which are not aligned with each other and/or are not aligned with a longitudinal axis of the reduction gear.

6. The reduction gear according to claim 2, wherein the first trough is connected to a radially inner annular wall forming part of said duct, and the second trough is connected to a radially outer annular wall forming part of said duct.

7. The reduction gear according to claim 1, wherein a perforated annular partition is housed in said chamber and is configured to deaerate the oil.

8. The reduction gear according to claim 7, wherein the first trough is connected to a radially inner annular wall forming part of said duct, and the second trough is connected to a radially outer annular wall forming part of said duct and wherein the partition comprises a first sector extending into the first trough, substantially at said radially inner annular wall (20a), and a second sector extending into the second trough, substantially at said radially outer annular wall.

9. An aircraft turbine engine, comprising a reduction gear according to claim 1.

10. A planetary reduction gear for an aircraft turbine engine, said reduction gear comprising a rotatable sun gear, a rotatable ring gear, and planet gears meshed with the sun gear and ring gear and carried by a planet carrier intended to be fixed to a stator, said reduction gear further comprising an annular gutter for recovering and channelling lubrication oil that is mounted around the ring gear, characterised in that the reduction gear further comprises an annular deflector fixed to the ring gear and configured to route the oil exiting radially towards the outside of the ring gear up to the gutter by virtue of centrifugal forces, the gutter comprising:
   c) an annular chamber which is axially remote relative to a median plane (P) substantially passing through a center of the ring gear, and
   d) an annular duct located on one side of said chamber and emerging into said chamber, this annular duct being configured to receive the oil routed by said deflector and to ensure its flow to the chamber,
   wherein the annular chamber defines a first upper semi-circular trough with a U-shaped axial cross-section, which extends substantially from 9 o'clock to 12 o'clock and from 12 o'clock to 3 o'clock by analogy with a dial of a clock, and a second lower semi-circular trough with a U-shaped axial cross-section, which extends substantially from 9 o'clock to 6 o'clock and from 6 o'clock to 3 o'clock by analogy with a dial of a clock, and wherein said first trough comprises a bottom defined by an inner cylindrical wall of the chamber, and said second trough comprises a bottom defined by an outer cylindrical wall of the chamber.

11. A planetary reduction gear for an aircraft turbine engine, said reduction gear comprising a rotatable sun gear, a rotatable ring gear, and planet gears meshed with the sun gear and ring gear and carried by a planet carrier intended to be fixed to a stator, said reduction gear further comprising an annular gutter for recovering and channelling lubrication oil that is mounted around the ring gear, characterised in that the reduction gear further comprises an annular deflector fixed to the ring gear and configured to route the oil exiting radially towards the outside of the ring gear up to the gutter by virtue of centrifugal forces, the gutter comprising:
   e) an annular chamber which is axially remote relative to a median plane (P) substantially passing through a center of the ring gear, and
   f) an annular duct located on one side of said chamber and emerging into said chamber, this annular duct being configured to receive the oil routed by said deflector and to ensure its flow to the chamber, wherein a perforated annular partition is housed in said chamber and is configured to deaerate the oil.

12. The reduction gear according to claim 1, wherein said annular chamber is located upstream of said median plane.

13. The reduction gear according to claim 10, wherein the outer cylindrical wall comprises a radial opening for discharging oil.

14. The reduction gear according to claim 10, wherein the inner and outer cylindrical walls have axes which are not aligned with each other and/or are not aligned with a longitudinal axis of the reduction gear.

15. The reduction gear according to claim 10, wherein the first trough is connected to a radially inner annular wall forming part of said duct, and the second trough is connected to a radially outer annular wall forming part of said duct.

16. The reduction gear according to claim 10, wherein a perforated annular partition is housed in said chamber and is configured to deaerate the oil.

17. The reduction gear according to claim 16, wherein the first trough is connected to a radially inner annular wall forming part of said duct, and the second trough is connected to a radially outer annular wall forming part of said duct and wherein the partition comprises a first sector extending into the first trough, substantially at said radially inner annular wall (20a), and a second sector extending into the second trough, substantially at said radially outer annular wall.

18. The reduction gear according to claim 10, wherein said annular chamber is located upstream of said median plane.

19. The reduction gear according to claim 10, wherein said annular duct extends about said free annular edge.

20. The reduction gear according to claim 11, wherein the annular chamber defines a first upper semi-circular trough with a U-shaped axial cross-section, which extends substantially from 9 o'clock to 12 o'clock and from 12 o'clock to 3 o'clock by analogy with a dial of a clock, and a second lower semi-circular trough with a U-shaped axial cross-section, which extends substantially from 9 o'clock to 6 o'clock and from 6 o'clock to 3 o'clock by analogy with a dial of a clock.

21. The reduction gear according to claim 20, wherein said first trough comprises a bottom defined by an inner cylindrical wall of the chamber, and said second trough comprises a bottom defined by an outer cylindrical wall of the chamber.

22. The reduction gear according to claim 21, wherein the outer cylindrical wall comprises a radial opening for discharging oil.

23. The reduction gear according to claim 21, wherein the inner and outer cylindrical walls have axes which are not aligned with each other and/or are not aligned with a longitudinal axis of the reduction gear.

24. The reduction gear according to claim 20, wherein the first trough is connected to a radially inner annular wall forming part of said duct, and the second trough is connected to a radially outer annular wall forming part of said duct.

25. The reduction gear according to claim 11, wherein the first trough is connected to a radially inner annular wall forming part of said duct, and the second trough is connected to a radially outer annular wall forming part of said duct and wherein the partition comprises a first sector extending into the first trough, substantially at said radially inner annular wall (20a), and a second sector extending into the second trough, substantially at said radially outer annular wall.

26. The reduction gear according to claim 11, wherein said annular chamber is located upstream of said median plane.

27. The reduction gear according to claim 11, wherein said annular duct extends about said free annular edge.

28. An aircraft turbine engine, comprising a reduction gear according to claim 10.

29. An aircraft turbine engine, comprising a reduction gear according to claim 11.

* * * * *